(12) United States Patent
Koike

(10) Patent No.: US 6,201,045 B1
(45) Date of Patent: *Mar. 13, 2001

(54) NON-BIREFRINGENCE OPTICAL RESIN MATERIAL, A PRODUCTION PROCESS THEREFOR AND A MEMBER FOR A LIQUID CRYSTAL DEVICE USING THE OPTICAL RESIN MATERIAL

(76) Inventor: Yasuhiro Koike, 534-23, Ichigao-cho, Aoba-ku, Yokohamam, Kanagawa-ken, 225 (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,859

(22) Filed: Oct. 21, 1997

Related U.S. Application Data

(63) Continuation of application No. 08/628,684, filed as application No. PCT/JP95/01635 on Aug. 18, 1995, now abandoned.

(30) Foreign Application Priority Data

Sep. 18, 1994 (JP) .................................................. 6-215270
Apr. 18, 1995 (JP) .................................................. 7-092904

(51) Int. Cl.$^7$ ............................... C08K 5/00; C08K 5/22; C08F 2/00
(52) U.S. Cl. .......................... 524/81; 524/190; 524/485; 524/486; 524/484; 525/932; 428/913
(58) Field of Search ..................................... 524/190, 485, 524/486, 81; 428/1, 913; 525/932; 526/78, 89

(56) References Cited

U.S. PATENT DOCUMENTS

| | | | |
|---|---|---|---|
| 4,373,065 | | 2/1983 | Prest, Jr. ............................. 525/132 |
| 4,913,949 | * | 4/1990 | Steininger et al. .................. 428/913 |
| 5,372,745 | * | 12/1994 | Yoshinaga et al. .................. 359/103 |
| 5,414,125 | * | 5/1995 | Hefner, Jr. et al. .................... 528/97 |
| 5,466,496 | * | 11/1995 | Jin ........................................... 428/1 |
| 5,478,518 | * | 12/1995 | Taketani et al. ..................... 528/196 |
| 5,498,450 | * | 3/1996 | Akashi et al. ........................... 428/1 |
| 5,521,035 | * | 5/1996 | Wolk et al. ............................ 430/20 |
| 5,534,570 | * | 7/1996 | Shih et al. ............................ 524/127 |
| 5,572,492 | * | 11/1996 | Ogawa et al. ......................... 369/14 |

FOREIGN PATENT DOCUMENTS

| | | |
|---|---|---|
| 60-158420 | 8/1985 | (JP) . |
| 61-19656 | 1/1986 | (JP) . |
| 61-108617 | 5/1986 | (JP) . |
| 61-275334 | 12/1986 | (JP) . |
| 62-240901 | 10/1987 | (JP) . |
| 63/300221 | 5/1988 | (JP) . |
| 2-129211 | 5/1990 | (JP) . |

* cited by examiner

Primary Examiner—Tae Yoon
(74) Attorney, Agent, or Firm—McDermott, Will & Emery

(57) ABSTRACT

A non-birefringence optical resin material is obtained by forming a transparent matrix from a polymeric resin having an orientation birefringence with a positive or negative sign, adding a low molecular weight substance exhibiting an orientation birefringence with a sign opposite to that of the orientation birefringence of the polymeric resin for the matrix and thus offsetting the orientation birefringence of the polymeric resin for the matrix with the orientation birefringence of the low molecular weight substance.

2 Claims, 2 Drawing Sheets

NON-BIREFRINGENCE OPTICAL RESIN MATERIAL, A PRODUCTION PROCESS THEREFOR AND A MEMBER FOR A LIQUID CRYSTAL DEVICE USING THE OPTICAL RESIN MATERIAL

This application is a continuation of application Ser. No. 08/628,684 filed Apr. 15, 1996 now abandoned which is also a 371 of PCT/JP95/01635 filed Aug. 18, 1995.

TECHNICAL FIELD

The present invention concerns a non-birefringence optical resin material which can be used as a material for various optical elements, that is, an optical resin material showing no substantial birefringence or showing only the birefringence to such an extent as giving no effect in view of practical use and a member for a liquid crystal device using the resin material.

BACKGROUND ART

In recent years, polymeric resins have been used more and more in place of existent glass materials, as usual optical components such as spectacle lenses or transparent plates, as well as material for optical components for opto-electronics, for example, optical components for laser equipment such as optical disc devices for recording sounds, video images and character information. This is because the optical material comprising the polymeric resin, that is, optical resin material, is light in weight, excellent in impact resistance and, further, excellent in fabricability and mass productivity due to easy applicability of molding techniques such as injection molding or extrusion molding, as compared with the glass optical material. Such characteristics are useful for various kinds of optical components as described above and are particularly useful in the case of using the optical resin material for various kinds of members constituting a liquid crystal device which is a main constituent element of a liquid crystal display. The liquid crystal display has been used generally as a display element in various kinds of electronic equipment and, along with generalization of the application use, further reduction in the weight and thickness has been demanded and also for the improvement of strength performance such as impact resistance and such demands can be satisfied by effectively taking advantage of the characteristics of the polymeric optical material.

As described above, the optical resin material has a possibility of providing excellent characteristics as optical components for which a wide variety of application uses for optical components have been expected. However, they are not actually utilized as expected. One of major reasons is that products obtained by applying the molding technique to the optical resin material show considerable birefringence, which may sometimes deteriorate their function as optical components.

Birefringence present in the polymeric resin material has been generally known together with the reasons thereof. FIG. 1 is a view for briefly explaining this. As shown in the figure, a polymeric optical material after a molding step is generally in a state in which a plurality of units (monomers) 1 constituting the polymer chain are bonded in a sterically specific orienting direction. In most of the polymeric materials usually used as the optical material, each of the units 1 has an optical anisotropy regarding refractive Index. Namely, the refractive index npr with respect to a polarization phase component in a direction parallel with the orienting direction is different from the refractive index nvt with respect to a polarization phase component in a direction perpendicular to the orienting direction.

As is well known, the optical anisotropy can be expressed by a index ellipsoid. In FIG. 1, an ellipsoidal mark 2 attached to each bonded unit 1 is in accordance with such expression. For example, in the case of polymethyl methacrylate (PMMA), the refractive index for each unit 1 (methyl methacrylate) is relatively smaller in the orienting direction and relatively larger in a direction perpendicular to the orienting direction. Accordingly, an index ellipsoid 3 in view of a macroscale is elongate as shown in the figure. That is, npr<nvt in the case of polymethyl methacrylate. The difference between both of them: $\Delta n = npr - nvt$ is referred to as a birefringence value. Table 1 shows birefringence values with respect to typical optical resin materials.

TABLE 1

Double Refraction Value of Polymeric Resin Matrix Material

| Material | Birefringence value $\Delta n = npr - nvt$ |
| --- | --- |
| Polystyrene | −0.100 |
| Polyphenylene oxide | +0.210 |
| Polycarbonate | +0.106 |
| Polyvinyl chloride | +0.027 |
| Polymethyl methacrylate | −0.0043 |
| Polyethylene terephthalate | +0.105 |
| Polyethylene | +0.044 |

For example, $\Delta n = -0.0043$ for polymethyl methacrylate shown in FIG. 1, and $\Delta n = -0.100$ for polystyrene. Further A n shows a positive value as $\Delta n = +0.044$ for polyethylene. Hereinafter, the birefringence due to orientation of a polymer Is referred to as orientational birefringence, and the direction of the index ellipsoid along a major axis is referred to as orientation birefringence direction. Further, when the sign for $\Delta n$ is positive ($\Delta n > 0$), it is expressed as "the sign of birefringence is positive", while when the sign for $\Delta n$ is negative ($\Delta n < 0$), it is expressed as "sign for birefringence is negative".

Such orientation birefringence particularly will cause a problem in an application where the polarization characteristic is important. An example is an optical component in a write/erase type opto-magnetic disc developed in recent years. That is, since a polarization beam is used for a reading beam or a writing beam in the write/erase type opto-magnetic disc, if a double refractive optical element (disc itself, lens or the like) is present in an optical path, it gives an undesired effect on the reading or writing accuracy.

Further, a liquid crystal device is mentioned in which birefringence of members used gives the most significant effect. As is well known, the liquid crystal device has a structure of controlling permission/inhibition of the light by rotating the plane of polarization light by a liquid crystal layer between a polarizer and an analyzer arranged as crossed nicols or parallel nicols. Accordingly, in a liquid display device, birefringence of each member constituting the device gives a significant problem, which hinders a generalized application of the optical resin material to the liquid crystal device.

For the orientation birefringence, various attempts have hitherto been made for eliminating the same, typical examples of which are as shown below.

(1) A method disclosed in the specification of U.S. Pat. No. 4,373,065; directed to obtain a non-birefringence optical resin material by blending two types of polymeric resins which have orientation birefringence with signs opposite to each other and which are compatible to each other completely.

(2) A method as disclosed in Japanese Patent Laid-Open Sho 61-19656; utilizing a method of mixing an aromatic polycarbonate and a specific styrenic copolymer at a ratio within a specified range and utilizing the thus obtained aromatic polycarbonic resin composition.

(3) A method as disclosed in Japanese patent Laid-Open Sho 62-240901; for obtaining a non-birefringence optical resin material comprising a mixture of a polymer mainly comprising aromatic vinyl monomeric units and polyphenylene ether, a block copolymer comprising polymeric portions of both of them or a mixture thereof.

(4) A method as disclosed in Japanese Patent Laid-Open Sho 61-108617 of random copolymerizing, graft polymerizing or block copolymerizing two or more monomers constituting positive and negative constituent units having a main polarity difference of not less than $50 \times 10^{-25}$ d by an absolute value.

(5) A method as disclosed in the Journal of "Optics", vol. 20, No. 20, pages 80 (30th)–81 (31th) (issued February 1991); proposed by the present inventor for obtaining a non-birefringence optical resin material by copolymerizing a monomer mixture of methyl methacrylate (MMA) and trifluoroethyl methacrylate (3FMA) or a monomer mixture of methyl methacrylate (MMA) and benzyl methacrylate (BzMA). In summary, monomers having opposite signs for orientation birefringence as a basis for giving a polymer are mixed and copolymerized in this method.

(6) A method of molding so as not to cause orientation in the polymer; which is a method adopted based on experience and for eliminating orientation upon molding, for example, by using casting, conducting extrusion molding at a greatly lowered extruding speed or further using biaxial stretching.

The above-mentioned prior art methods can provide respective results to some extent but still involve not a few insuffucient aspects. For example, in the method (1) of blending the two types of polymeric resins, polymeric resins to be blended have to be in a molten state or a solution state in order to mix them at a high uniformity. Then, even by adopting such means, it is actually extremely difficult to obtain a practical polymeric resin showing entirely uniform and less birefringence. In addition, the polymeric resin blend composition obtained by this method inevitably suffers from light scattering caused by irregularity of the refractive index due to the difference of the refractive index inherent to each of the blended polymeric resins, thereby failing to obtain an optical material of excellent transparency.

Among the methods at or after (2), an optical material of high transparency can be theoretically expected in the method of forming the polymeric resin of less orientation birefringence by random copolymerization. However, since two or more of the monomers as a basis for forming the polymeric resin are mixed for random copolymerization in this method, it is necessary to make the monomer reactivity ratio between the monomers closer to 1. However unfortunately, there is so few combinations of materials capable of satisfying such a condition. Accordingly, it involves a problem that the range for the selection of materials is narrowed and that materials can not be selected optionally with a view point, for example, of physical strength or heat resistance.

Although the proposal (5) described above includes such a combination, the method of using the monomer mixture of methyl methacrylate (MMA) and trifluoroethyl methacrylate (3FMA) involves a problem in that the latter material (3FMA) is extremely expensive.

Further, in each of the methods of copolymerizing the monomer mixture of methyl methacrylate (MMA) and trifluoroethyl methacrylate (3FMA) and the method of copolymerizing the monomer mixture of methyl methacrylate (MMA) and benzyl methacrylate (BzMA), occurrence of the orientation birefringence can not be suppressed unless the mixing ratio of trifluoroethyl methacrylate (3FMA) or benzyl methacrylate (BzMA) to methyl methacrylate is Increased considerably. That is, the mixing ratio required for offsetting the orientation birefringence Is MMA/3FMA=50/50 (wt %/wt %) in the former, and MMA/BzMA=80/20 (wt %/wt %) in the latter. Therefore, the resultant material can not have a characteristic equivalent to PMMA and is inferior to PMMA in view of mechanical characteristics or transparency.

In the method (4) of utilizing the graft copolymerization, it is difficult to previously forecast and control the strength of the orientation birefringence of the synthesized resin in a quantitative manner regarding the combination of monomers used, and it is uncertain whether products capable of sufficiently offsetting the orientation birefringence are obtainable or not until the synthetic reaction is actually conducted. Accordingly, it is difficult to manufaccture products of industrially stable quality.

Further, the method (6) is actually used at present for the production of optical resin material used as the member for the liquid crystal device but it can not help deteriorating fabricability and mass-productivity which are the inherent characteristics of the optical resin material. As a result, it leads to a remarkably Increased cost, which restricts the application range of the optical resin material obtained by this method to the liquid crystal device.

Summarizing the above, each of the methods of the prior art still involve problems in that the method; provides fabrication difficulty and can not obtain highly transparent material (method (1)); suffers from restriction for the selection of the material (methods (2) and (3)); has a drawback in the stability of the products (method (4)); requires increased material cost and tends to deteriorate physical property or transparency (method (5)); and can not utilize high fabricability and productivity which are remarkable merits of the optical resin material (method (6)). The problems hinder generalized applications of the optical resin material.

It is accordingly an object of the present invention to provide a technique capable of providing an optical resin material with high non-birefringence without undergoing restrictive conditions as found in the various methods of the prior art. It is also an object of the present invention to provide a member for a liquid crystal device by utilizing the characteristic of the optical resin material obtained by the technique according to the invention.

DISCLOSURE OF THE INVENTION

For attaining the foregoing object in the present invention, an optical resin material is formed in a composition having a matrix comprising a transparent polymer resin and a low molecular weight material, added there, showing orientation birefringence tending to offset orientation birefringence of the polymeric resin for the matrix.

In the optical resin material in accordance with the present invention, the non-birefringence is attained by a method which is basically different from each of the prior art methods described above. Namely, in the optical resin material according to the present invention, the matrix-forming polymeric resin has the orientation birefringence with positive or negative sign, whereas the low molecular weight substance added to the resin shows the orientation birefringence with a sign opposite to that of the orientation birefringence in the polymeric resin, and high non-birefringence is attained since both the orientation birefringences are offset each other of them. In the optical resin material according to the present invention, the polymer chain causes orientation when the material is subjected to external action such as stresses upon molding fabrication or the like, and the low molecular weight substance mixed and added also causes orientation along with the orientation of the polymer chain. Then, since the major axis direction of the index ellipsoid in the low molecular weight substance is oriented in relation with the orientation of the polymer chain in a direction perpendicular to the major axis direction of the index ellipsoid in the polymer, the orientation birefringence Is reduced as a whole to obtain the non-birefringence. Accordingly, the birefringence can be made closer to zero by merely adjusting the addition amount in accordance with the kind of the polymeric resin and the low molecular weight substance to be combined.

The low molecular weight substance in the optical resin material according to the present invention has no substantial concerns with the polymerizing reaction of the polymeric resin for the matrix. That is, it has no reactivity with the monomers forming the polymeric resin. Accordingly, it is free from restriction by the reactivity ratio as in the prior art method of mixing and random copolymerizing plurality kinds of monomers corresponding to the polymeric resin and can optionally select the kind of polymeric resin. In addition, the low molecular weight substance generally has a greater optical anisotropy regarding the refractive index as compared with the polymeric resin, so that a relatively smaller addition amount is sufficient to offset the orientation birefringence in the polymeric resin for the matrix. This can avoid substantial effect given on the characteristic such as the physical property or the transparency of the polymeric resin for the matrix, and provide a significant merit capable of utilizing the characteristic inherent to the polymeric resin for the matrix as it is in the optical resin material.

In addition, since the non-birefringence Is attained in the optical resin material according to the present invention by offsetting with the low molecular weight substance described above, there is no requirement of taking consideration for not causing orientation in the polymer and any molding technique excellent in fabricability and mass-productivity such as injection molding or extrusion molding can be optionally applied for the fabrication.

Further, according to the present invention, an optical resin material of more excellent fabricability can be obtained by using, as the low molecular weight substance for offsetting the orientation birefringence, those low molecular weight substances also having a function of improving the plasticity of the polymeric resin for the matrix, that is, having a plasticizer function. That is, if a polymeric resin selected for the matrix in view of heat resistance or mechanical strength is poor in the stretchability and, accordingly, causes difficulty in such fabrication as requiring high stretchability as fabrication into sheet or film-like shape, the required stretchability can be attained by providing the additive of low molecular weight substance which has the plasticizer function, and an optical resin material having a high non-birefringence and excellent fabricability can be obtained.

As described above, it is necessary that the low molecular weight substance in the optical resin material according to the present invention cause orientation along with the orientation of the skeleton chain of the polymeric resin and, for this purpose, it is required to satisfy the condition that the polarizability be greater in a certain direction. Tables 2–4 show typical examples of low molecular weight substances capable of satisfying such conditions and are usable as the additives in the present invention. In addition, there can be mentioned, for example, 1,4-diphenyl-1,3-butadiene, dibenzofuran, benzacetophenon and benzalazine.

TABLE 2

Example I for low molecular weight substance usable as additives

| Material | Structural formula |
| --- | --- |
| Diphenyl sulfide | Ph—S—Ph |
| Benzyl benzoate | Ph—C(=O)—O—CH$_2$—Ph |
| Biphenyl | Ph—Ph |
| P-terphenyl | Ph—Ph—Ph |
| Benzoin | Ph—CH(OH)—C(=O)—Ph |
| Trans-stilbene | Ph—CH=CH—Ph |
| Azomethin | Ph—CH=N—Ph |

TABLE 3

Example II for low molecular weight substance usable as additives

| Material | Structural formula |
|---|---|
| Diphenylacetylene | Ph–C≡C–Ph |
| Azobenzene | Ph–N=N–Ph |
| p-styrylstibene | Ph–CH=CH–C$_6$H$_4$–CH=CH–Ph |
| Naphthalene | (naphthalene structure) |
| Anthracene | (anthracene structure) |
| N,N'-bisbenzilidenebenzidine | Ph–CH=N–C$_6$H$_4$–C$_6$H$_4$–N=CH–Ph |
| p-Dianizalbenzidine | CH$_3$O–C$_6$H$_4$–CH=N–C$_6$H$_4$–C$_6$H$_4$–N=CH–C$_6$H$_4$–OCH$_3$ |
| 4'-methoxybenzilideneaminoazobenzene | CH$_3$O–C$_6$H$_4$–CH=N–C$_6$H$_4$–N=N–Ph |
| Terephthalbis(p-phentidine) | CH$_3$CH$_2$O–C$_6$H$_4$–N=CH–C$_6$H$_4$–CH=N–C$_6$H$_4$–OCH$_2$CH$_3$ |

TABLE 4

Example III for low molecular weight substance usable as additives

| Material | Structural formula |
|---|---|
| 4'-methoxybenzilideneaminostilbene | CH$_3$O–C$_6$H$_4$–CH=N–C$_6$H$_4$–CH=CH–Ph |
| Styrene oligomer | (not illustrated) |
| Benzylmethacrylate oligomer | (not illustrated) |

For example, in a case of using polymethyl methacrylate (PMMA) which is one of typical optical resin materials as a polymeric resin matrix, an optical resin material with restricted orientation birefringence can be obtained by using, as the low molecular weight substance providing birefringence of opposite sign, stilbene or diphenyl sulfide, or so-called liquid crystal substance such as N,N-bisbenzilidenebenzidine or 4'-methoxybenzilidene aminostilbene.

The substances shown here such as stilbene, diphenyl sulfide and liquid crystal substance cause no reaction with monomers upon polymerization as described above. A non-birefringence optical resin material substantially eliminated with the orientation birefringence can be obtained by properly controlling the addition amount of the low molecular weight substance.

For the low molecular weight substance in the optical resin material according to the present invention, it is preferable to use those also having a plasticizer function depending on the property of the polymeric resin for the matrix. As typical examples of such low molecular weight substance, there can be mentioned, for example, phthalic acid derivatives such as diphenyl phthalate, dibenzyl phthalate, n-butylbenzyl phthalate; phosphoric acid derivatives such as triphenyl phosphate, tricresyl phosphate or cresyl diphenyl phosphate: isophthalic acid derivative such as dimethyl isophthalate or di(2-ethylhexyl) isophthalate; benzoic acid derivative such as benzophenone, acetophenone or benzoic acid anhydride; and, further, terephthalic acid derivative such as terephthalic acid bis(4-(methoxycarbonyl)phenyl)ester.

One of parameters for selection from these low molecular weight substances is that the selected substance be able to satisfy the relationship that the addition amount as a plasticizer required for giving an aimed plasticity also gives an addition amount required for offsetting the orientation birefringence in the polymeric resin for the matrix.

The low molecular weight substance referred to in the present invention generally means "molecular substance having molecular weight not more than 5000, preferably, not more than 1000". A substance with molecular weight In excess of 5000 has a substantially identical compatibility with the polymeric resin material but it tends to form an agglomerated structure to inevitably deteriorate the uniformness of the refractive index. Accordingly, this increases light scattering loss, which is not preferable for obtaining an optical resin material of high transparency. In addition, it will be difficult to homogeneously disperse the low molecular weight substance in the polymeric resin material through the kneading step used in the production process to be described later.

As a low molecular weight substance to be combined with a polymeric resin having the orientation birefringence of a negative sign (for example, methyl polymethacrylate, polystyrene), those having a greater refractive index in the longitudinal direction of the molecule than that in the direction perpendicular thereto, which includes stilbene, biphenyl, diphenylacetylene and usual liquid crystal substances are selected.

On the other hand, for the polymeric resin having orientation birefringence with positive sign (for example, polycarbonate, polyethylene terephthalate), those causing orientation such that the refractive index is greater in the direction perpendicular to the orienting direction of the polymer chain are selected. Specific examples of such low molecular weight substances include styrene oligomer, benzyl methacrylate oligomer or low molecular weight substance referred to as a λ type molecule having a structure in which the molecule is bent In the doglegged configuration.

No particular characteristics are required for the polymeric resin for the matrix used in the present invention so long as the resin undergoes no restrictive conditions such as the reactivity described above and it has a general adaptability as an optical material, for example, transparency. Accordingly, the degree of freedom for the selection of the material forming the polymeric resin matrix is extremely broad and they can be selected optionally, while considering general adaptability as the optical material, as well as other properties such as heat resistance and mechanical strength, depending on the application use, from a wide variety of materials such as polyallylate, polyether sulfone, polyethylene naphthalate, polymethylpentene-1 and cycloaliphatic polyolefin (for example, dicyclopentadiene polyolefin or norbornene polyolefin) and, further, copolymer of cycloaliphatic(meth)acrylate (for example, tricyclodecanyl methacrylate, cyclohexyl methacrylate or isobornyl methacrylate) with (meth)acrylate such as MMA.

In the production of the optical resin material according to the present invention as described above, a method of mixing the low molecular weight substance before initiating the polymerizing reaction, or after initiating and before completing the polymerizing reaction of synthesizing a transparent polymeric resin matrix, can be adopted. That is, the optical resin material is obtained by mixing, with a monomer forming the polymeric resin matrix, a low molecular weight substance which has no reactivity to the monomer and can be arranged so as to give orientation birefringence with a sign opposite to that of the orientation birefringence of the polymeric resin material, properly adding thereto a polymerization initiator and a chain transfer agent and supplying energy such as heating or UV-ray irradiation thereby proceeding the polymerizing reaction.

The kind and the amount of the polymerization initiator and the chain transfer agent may be selected in accordance with a similar basis to that in a typical polymerizing reaction. For example, in a case of heat polymerization, a peroxide such as benzoyl peroxide (BPO) can be used as a heat polymerization initiator. In a UV-ray irradiation, benzoin methyl ether (BME) can be used as a UV-radical polymerization initiator. As the chain transfer agent, normal butyl mercaptan (nBM) is usable In any of the cases.

Also in a case of causing a polymerizing reaction without using the polymerization initiator, not in the successive polymerization of initiating the polymerizing reaction by using the polymerization initiator, the low molecular weight substance can be present together with no concern for the polymerization. For example, it is also possible to obtain a non-birefringence polymeric resin material by stepwise polymerization, ring-opening polymerization or ring-closing polymerization based on reactions between functional groups, with no concern for the low molecular weight substance to the polymerization. The production process according to the present invention is generally applicable to any of the known polymerization processes.

As another production process for the optical resin material according to the present invention, it is also possible to add a low molecular weight substance to heat-melted products of a matrix-forming polymeric resin material and, through the process of kneading them together, disperse the low molecular weight substance in the matrix-forming polymeric resin material. The material sufficiently kneaded according to the present process, is preferably pelleted by an appropriate means for making products. The pelleted kneading products are molded into a desired shape by a usual molding technique such as injection molding or extrusion molding.

The essential point of this method resides in adding the low molecular weight substance capable of offsetting the orientation birefringence of the polymeric resin material to the resin material in a molten state and, so long as the process includes such a kneading step, the resultant optical resin material shows high non-birefringence irrespective of the molding methods used before and after this step.

Instead of adding and kneading the low molecular weight substance for offsetting the orientation birefringence in the heat-melting step, it is possible to utilize a process of dissolving a matrix-forming polymeric resin material into an appropriate solvent, adding and uniformly kneading a low molecular weight substance for offsetting the orientation birefringence into the solution and then removing the solvent, for example, by an evaporation step. A non-birefringence optical resin material can be obtained by fabricating the composition obtained by this method into a desired shape by injection molding or extrusion molding.

As described above, the optical resin material according to the present invention can be utilized in view of its various properties described above to various kinds of optical components and it has particularly higher usefulness as the member for a liquid crystal device. An example is a liquid crystal device substrate disposed between a liquid crystal layer and a polarization plate. If the substrate is formed with the optical resin material according to the present invention, it is possible to improve various performances of the liquid crystal device by effectively utilizing the advantages of the optical resin material in comparison with the glass optical material.

A polarization plate for a liquid crystal device is formed by bonding transparent resin sheets on both surfaces of a polarizer, and the optical resin material according to the present invention is particularly suitable to the transparent resin sheet and can improve various performances of the liquid crystal device in the same manner as described above.

Further, the optical resin material according to the present invention is preferably used as adhesives for bonding each of the elements constituting a liquid crystal device as a method capable of effectively utilizing the high non-birefringence and degree of freedom for the selection of the materials. That is, in existing liquid crystal devices, since highly non-birefringence resin material for adhesive was not available, each of the elements was bonded by means of adhesives except for when a high non-birefringence was not required, for example, in monochromatic devices. By using adhesives made of the optical resin material according to the present invention instead of the usual adhesive, it is possible to improve the performance of the liquid crystal device in view of durability and heat resistance.

BEST MODE FOR CARRYING OUT THE INVENTION

Example 1

Figure 1:
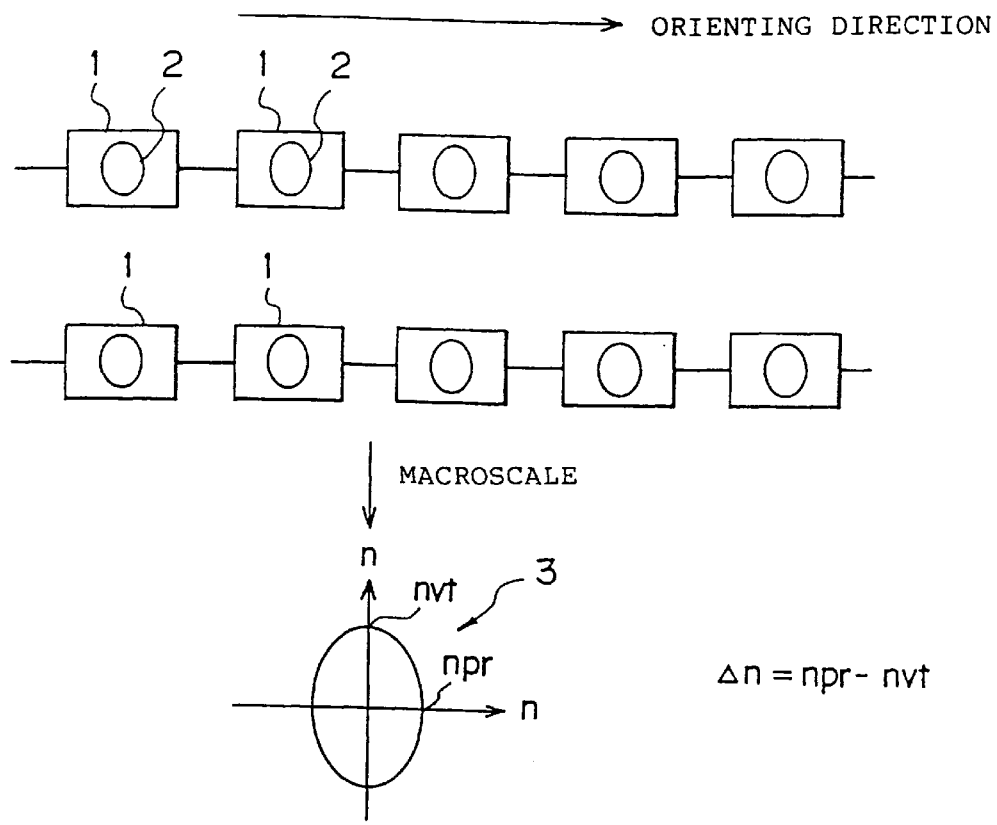
FIG. 1 is an explanatory view for birefringence of a polymeric resin material exhibited upon orientation.
Figure 1:
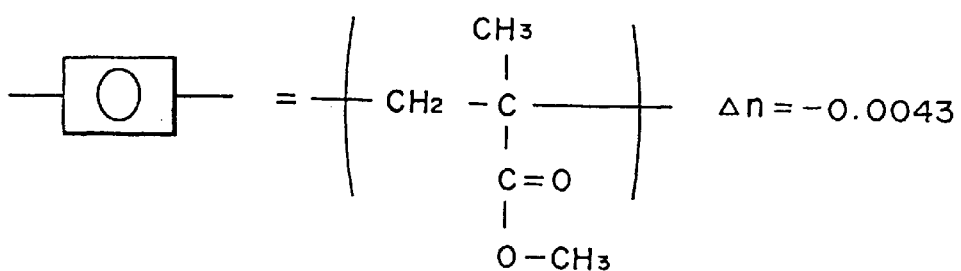
Figure 1:
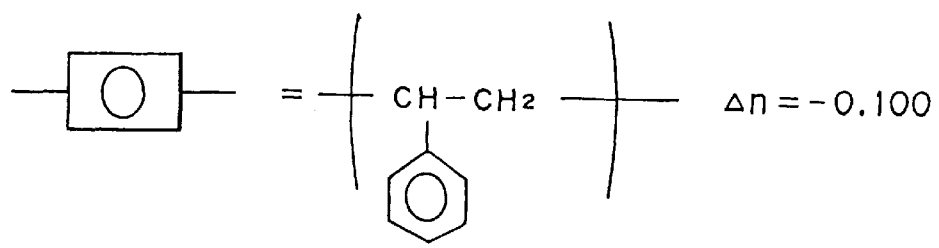

Methyl methacrylate (MMA) was provided as a monomer forming a polymeric resin matrix, to which 0.5 wt % of benzoyl peroxide (BPO) as a polymerization initiator and 0.3 wt % of normal butyl mercaptan (nBM) as a chain transfer agent were mixed. 3 wt % of stilbene was mixed as a low molecular weight substance to the mixed solution and polymerized at 70° C.

The resultant polymer was heat-treated at 90° C. for 24 hours to form a non-birefringence optical resin material. The resin material was dissolved in ethyl acetate to prepare an ethyl acetate solution containing 10 wt % of ethyl acetate. The ethyl acetate solution was cast on a glass sheet and ethyl acetate as the solvent was evaporated to obtain a resin material film of 100 μm thickness. The resin material film was further stretched twice at 95° C., and the orientation birefringence was measured using a precious strain gage. As a result, it was found that the value for the orientation birefringence was less than the measuring limit (0.0001). It was also confirmed that the polymer thus formed had a glass transition point at 90° C. and had a heat resistance with no practical problems.

When the light scattering loss of the resultant non-birefringence optical resin material was measured at a measuring wavelength of 633 nm, it was 20 dB/km. The value was at a level capable of enduring as a material for optical fiber or optical wave guide. Also for the mechanical property and chemical stability, no deterioration was recognized as compared with polymethyl methacrylate (PMMA) as a polymeric resin matrix.

Example 2

Methyl methacrylate (MMA) was provided as a monomer forming a polymeric resin matrix, to which 0.5 wt % of benzoyl peroxide (BPO) as a polymerization initiator and 0.3 wt % of normal butyl mercaptan (nBM) as a chain transfer agent were mixed, and 3 wt % of stilbene was mixed as a monomeric substance. Suspension polymerization was conducted by using the mixed solution in an aqueous solution of 0.8 wt % polyvinyl alcohol under the temperature condition at 70° C.

The resultant polymer particles were heat-treated at 90° C. for 24 hours to obtain particles of a non-birefringence optical resin material. The particles were injection molded under a temperature condition at 120° C. into a flat plate of 5 mm thickness. When the orientation birefringence was measured using a precise strain gauge, it was found that the value of the orientation birefringence was less than a measuring limit (0.0001) like that in Example 1. It was confirmed that the polymer thus prepared had a grass transition point of 85° C. and had heat resistance with no practical problems.

Further, when the light scattering loss of the resultant non-birefringence optical resin material was measured at a measuring wavelength of 633 nm, it was about 45 dB/km. The value was inferior to the result obtained in Example 1, but this Is a level quite free from problems so long as the material is used as a material for an optical element for a short or medium length optical path (for example about several meters).

Example 3

Methyl methacrylate (MMA) was provided as a monomer forming a polymeric resin matrix, to which 0.5 wt % of benzoyl peroxide (BPO) as a polymerization initiator and 0.3 wt % of normal butyl mercaptan (nBM) as a chain transfer agent were mixed, and 3 wt % of stilbene was further mixed as a monomeric substance.

Suspension polymerization was conducted by using the mixed solution in an aqueous solution of 0.8 wt % polyvinyl alcohol under a temperature condition at 70° C.

The resultant polymer particles were heat-treated at 90° C. for 24 hours to obtain particles of a non-birefringence optical resin material. The particles were pelleted by a pelletizer and injection molded into a flat sheet of 5 mm thickness by using an injection molding machine at a temperature condition of about 200° C. When the orientation birefringence was measured using a precise strain gauge, no birefringence was observed.

Example 4

Commercially available polymethyl methacrylate (PMMA) pellets were melted under heating, to which 3 wt % of stilbene as a low molecular weight substance was added and kneaded sufficiently. They were pelleted by a usual method using a pelletizer to obtain pellets comprising non-birefringence optical resin material having polymethyl methacrylate (PMMA) as a matrix. The pellets were injection molded using an injection molding machine to obtain a flat sheet of 5 mm thickness. When the orientation birefringence was measured using a precise strain gauge, the value for the orientation birefringence was less than the measuring limit (0.0001).

Example 5

Commercially available polymethyl methacrylate (PMMA) pellets were melted under heating, to which 3 wt % of stilbene as a low molecular weight substance was added and kneaded sufficiently. They were directly put into an injection molding machine to obtain a flat sheet of 5 mm thickness. It was confirmed that the optical resin sheet was homogeneous and highly transparent like that in Example 3 and Example 4. Further, when the birefringence was observed in crossed nicols using two polarization plates for examining polarization characteristic, no birefringence was observed.

Example 6

Polycarbonate was melted under heating and a styrene oligomer was added by 20 wt % to the polycarbonate. Both of them were homogeneously kneaded and then compressed in a molten mixture state being put between two glass sheets, to obtain a optical resin material film of about 100 μm thickness. The optical resin material film was further stretched at 170° C. by 1.5 times and the orientation birefringence was measured using a precise strain gauge.

The measured value for the orientation birefringence was $8 \times 10^{-4}$. The value was about half the value of a polycarbonate film of an identical shape used ordinarily stretched under the same conditions. That is, in the optical resin obtained in this example, the orientation birefringence may not be said to have been offset completely, but offset of the orientation birefringence can be attained to a considerable level.

The optical resin materials according to the present Invention have been explained above with reference to six examples, but it will be apparent that non-birefringence optical resin material can be attained not only with the combinations of the polymeric resin matrix shown in Table 1 and the substances shown in Tables 2 and 3 but also with combinations of polymeric resin matrix and low molecular weight substance not shown in the tables. Further, it will be apparent that products with restricted orientation birefringence can also be obtained also in a case of preparing molding products by utilizing casting polymerization.

Example 7

Figure 2:
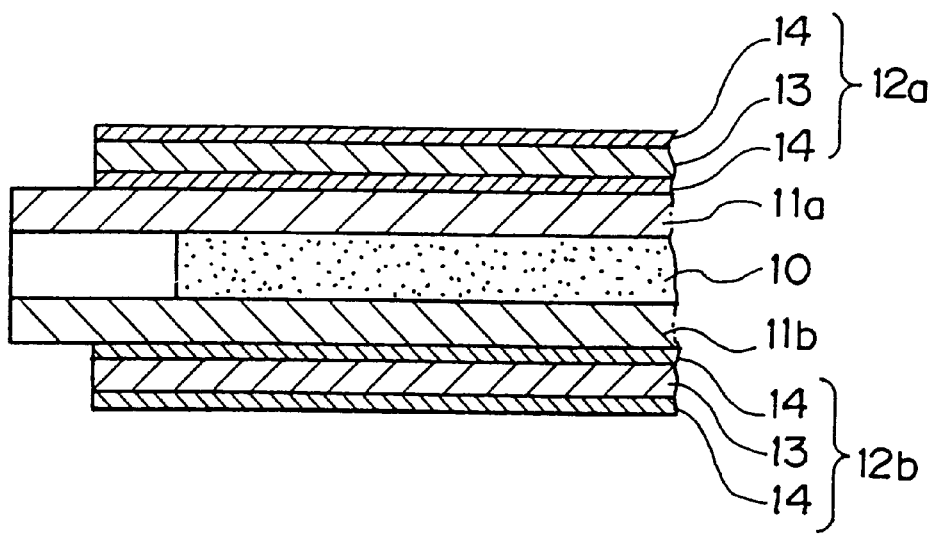
FIG. 2 is a schematic view of a liquid crystal device using an optical resin material according to the present invention.

This is an example of using the optical resin material according to the present invention for several elements in a liquid crystal device, and the constitution of which is shown in FIG. 2. In this example, each of substrates 11a, 11b disposed above and below a liquid crystal layer 10 is formed with the optical resin material according to the present invention, each of transparent resin sheets 14 to be bonded to both surfaces of a polarizer 13 in each of upper and lower polarization plates 12a, 12b is formed with an optical resin material according to the present invention and, an adhesive made from the optical resin material according to the present invention is used for bonding between each of the substrates 11a, 11b and each of the polarization plates 12a, 12b.

Example 8

Figure 3:
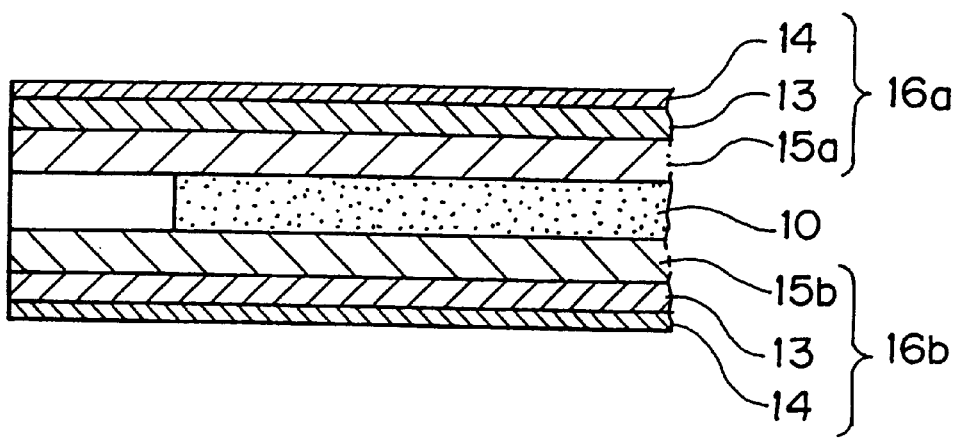
FIG. 3 is a schematic view of another liquid crystal device using an optical resin material according to the present invention.

This is also an example of using the optical resin material according to the present invention to a liquid crystal device, which is greatly different from Example 7 only in that each of substrates 15a, 15b is used also as the transparent resin sheet 14 on the liquid crystal layer 10 in Example 7, and each of the polarization plates 16a, 16b is integrated with each of the substrates 15a, 15b as shown in FIG. 3.

INDUSTRIAL APPLICABILITY

According to the present invention, high non-birefringence can be provided to the optical resin material without undergoing restrictive conditions as in the various kinds of methods of the prior art. As a result, it is possible to greatly extend the range for selecting the starting materials for the non-birefringence optical resin material, and the optical characteristic and the mechanical characteristic of the starting material thus optionally selected can be utilized as they are to provide a non-birefringence optical resin material having excellent optical and mechanical characteristics at a reduced cost. Further, according to the present invention, it is possible to improve various kinds of performances of a liquid crystal device using the optical resin material as described above, for example, for various kinds of members.

What is claimed is:

1. A process of exhibiting no orientation birefringence of a polymeric resin material comprising rendering an orientation birefringence of a low molecular weigh substance added to a matrix including a transparent polymeric resin material to offset an orientation birefringence caused in the polymeric resin material in conjunction with an orientation of a polymeric chain of the polymeric resin material due to an external force caused by a molding process when the external force is applied to the optical resin material including the matrix, wherein said low molecular weight substance is oriented in conjunction with an orientation of the polymeric chain of the polymeric resin material caused by the external force, thereby exhibiting a specific orientation birefringence which further exhibits a symbol inverse to that in said orientation birefringence of the polymeric resin material caused when said polymeric chain of the polymeric resin material is oriented by the external force, and further an addition amount of the low molecular weight substance is adjusted in accordance with proportions of values between said orientation birefringence of the polymeric resin material and that of said low molecular weight substance to render the latter to offset the former, thereby to exhibit non-birefringence as a whole.

2. A process for producing an optical resin material, wherein said process includes a step of mixing a low molecular weight substance before starting a polymerizing reaction or after starting and before completing the polymerizing reaction for synthesizing a transparent polymeric resin for a matrix and wherein the optical resin material exhibiting no birefringence as a whole even when a polymeric chain of the polymeric resin material is oriented by an external force due to a molding process, wherein said low molecular weight substance is oriented in conjunction with an orientation of the polymeric chain of the polymeric resin material caused by the external force, thereby exhibiting the specific orientation birefringence which exhibits a symbol inverse to that in said orientation birefringence of the polymeric resin material caused when the polymeric chain of the polymeric resin material is oriented by the external force, and an addition amount of the low molecular weight substance is adjusted in accordance with proportions of values between the orientation birefringence of the polymeric resin material and that of the low molecular weight substance to render the latter to offset the former, thereby to exhibit non-birefringence as a whole.

* * * * *